United States Patent [19]

Wright et al.

[11] Patent Number: 4,728,261
[45] Date of Patent: Mar. 1, 1988

[54] PROPELLER MODULE FOR AN AERO GAS TURBINE ENGINE

[75] Inventors: William B. Wright; Martyn Richards, both of Derby, England

[73] Assignee: Rolls-Royce plc, London, England

[21] Appl. No.: 914,163

[22] Filed: Oct. 1, 1986

[30] Foreign Application Priority Data

Nov. 2, 1985 [GB] United Kingdom ............... 8527056

[51] Int. Cl.$^4$ ............................................. B64C 11/48
[52] U.S. Cl. ................................ 416/127; 416/157 B; 416/129
[58] Field of Search .............................. 416/127–130, 416/157 B

[56] References Cited

U.S. PATENT DOCUMENTS

| | | | |
|---|---|---|---|
| 2,394,299 | 2/1946 | Friedrich | 416/128 |
| 2,679,907 | 6/1954 | Frankland | 416/33 X |
| 2,876,848 | 3/1959 | Detamore et al. | 416/127 |
| 2,948,343 | 8/1960 | Conn et al. | 416/129 |
| 4,486,146 | 12/1984 | Campion | 416/127 X |
| 4,563,129 | 1/1986 | Pagluica | 416/170 R X |
| 4,591,313 | 5/1986 | Miyatake et al. | 416/155 |
| 4,688,995 | 8/1987 | Wright et al. | 416/127 |

FOREIGN PATENT DOCUMENTS

| | | | |
|---|---|---|---|
| 865942 | 6/1941 | France | 416/130 |
| 865943 | 6/1941 | France | 416/130 |
| 875564 | 9/1942 | France | 416/127 |
| 887543 | 11/1943 | France | 416/130 |
| 977459 | 4/1951 | France | 416/129 |
| 402942 | 3/1943 | Italy | 416/127 |
| 403673 | 5/1943 | Italy | 416/127 |
| 407125 | 9/1944 | Italy | 416/130 |
| 2145777 | 4/1985 | United Kingdom | 416/170 R |

*Primary Examiner*—Everette A. Powell, Jr.
*Attorney, Agent, or Firm*—Cushman, Darby & Cushman

[57] ABSTRACT

A propeller module for a gas turbine engine comprising two contra-rotating propellers has a reduction gear positioned axially between the propellers. Pitch change mechanisms are provided to change the pitch of the blades of both propellers independent of the differential speed of the propellers.

11 Claims, 7 Drawing Figures

PROPELLER MODULE FOR AN AERO GAS TURBINE ENGINE

The present invention relates to a propeller module for an aero gas turbine engine, particularly for a propeller module comprising two contra-rotating propellers.

In one arrangement a propeller module for an aero gas turbine engine of the type with two contra-rotating propellers positioned at the upstream or downstream end of the gas turbine engine, known as tractor or pusher propellers respectively requires a differential reduction gear to drive the propellers in contra-rotation. The propellers also require a mechanism to control blade pitch.

A reduction in axial length of the propeller module, and aero gas turbine engine, together with a reduction in weight of the aero gas turbine engine, has been achieved by positioning the reduction gear axially between the propellers, and rotatably mounting one propeller from a cantilever structure depending from the aero gas turbine engine, and rotatably mounting the second propeller on the first propeller.

This arrangement has made the control of blade pitch by an actuator remote from one of the propellers very difficult. However, our prior patent application No. 8,509,837 discloses a pitch change mechanism which is mounted on a planet gear carrier, and which varies the pitch of the propeller remote from an actuator by rotatably mounting pitch change gears to the planet gears of the reduction gear. The actuator rotates with the second propeller, and this causes the pitch change mechanism for the propeller remote from the actuator to be dependent on propeller differential speed.

The present invention seeks to provide a propeller module of the type with two contra-rotating propellers driven by a differential reduction gear positioned axially between the propellers which has pitch change mechanisms for both propellers which are independent of propeller differential speed.

Accordingly the present invention provides a propeller module for a gas turbine engine comprising a first multi-bladed propeller and a second multi-bladed propeller, the first and second multi-bladed propellers being coaxial and being driven in contra-rotation by a coaxial engine shaft via a reduction gear train, the reduction gear train being positioned axially between the first and second multi-bladed propellers, the reduction gear train comprising a sun gear driven by the shaft, a number of planet gears driven by the sun gear and an annulus gear driven by the planet gears, the planet gears being rotatably mounted in and driving a carrier member, the annulus gear and carrier member being driven in contra-rotation by the planet gears, first and second pitch change means for the first and second multi-bladed propellers, the first and second pitch change means being operated by a pitch change power unit mounted to the hub of the second multi-bladed propeller, the first pitch change means comprising a first drive means rotatably mounted on the hub of the first multi-bladed propeller and adapted to rotate the blades of the first multi-bladed propeller, first pitch change gears rotatably mounted to the planet gears and arranged to drive the first drive means, compensating gears rotatably mounted on the carrier and adapted to drive the first pitch change gears so that at fixed blade pitch the first drive means rotates in the same direction and at the same speed as the first multi-bladed propeller, the pitch change power unit adpated to drive the compensating gears to cause relative rotation between the first drive means and the first multi-bladed propeller to change the pitch of the blades of the first multi-bladed propeller, the compensating gear allowing the pitch of the first multi-bladed propeller to be set independent of differential speed between the first and second multi-bladed propellers.

The annulus gear may drive the first multi-bladed propeller and the carrier member may drive the second multi-bladed propeller, the compensating gears comprising gears driven by the planet gears and driving a first and second ring gear which are secured to each other, a number of planet gears being driven by the second ring gear, the planet gears driving a first and second spur gear rotatably mounted on the carrier member and secured to each other, the second spur gear driving the pitch change gears, the compensating gears being arranged so that the planet gears rotate about their axes of rotation but do not rotate relative to the carrier member when the pitch of the blades is fixed, the pitch change power unit being adapted to rotate the planet gears of the compensating gears relative to the carrier member to cause relative rotation between the first drum and the first multi-bladed propeller.

The pitch change power unit may drive first planet gears via a sun gear, the first planet gears being coaxial with and fixed to second planet gears by spindles, the second planet gears meshing with a ring gear fixed to the second multi-bladed propeller, the planet gears of the compensation gear being coaxial with and rotatably mounted on the spindles, operation of the pitch change power unit causing relative rotation between the sun gear and the ring gear fixed to the second multi-bladed propeller to cause rotation of the first and second planet gears and the planet gears of the compensating gears relative to the carrier member.

The annulus gear may drive the second multi-bladed propeller and the carrier member may drive the first multi-bladed propeller, the compensating gears comprising gears driven by the planet gears and driving a first and second spur gear secured to each other and rotatably mounted on the carrier member, a number of planet gears being driven by the second spur gear the planet gears driving a third spur gear rotatably mounted on the first and second spur gears, the third spur gear driving the pitch change gears, the compensating gears being arranged so that the planet gears rotate about their axes of rotation but do not rotate relative to the carrier member when the pitch of the blades is fixed, the pitch change power unit being adapted to rotate the planet gears of the compensating gears relative to the carrier member to cause relative rotation between the first drum and the first multi-bladed propeller.

The pitch change power unit may drive the planet gears of the compensating gears via a ring gear, operation of the pitch change power unit causing relative rotation between the ring gear and the second multi-bladed propeller causing the planet gears to rotate relative to the carrier member.

The second pitch change means may comprise a second drive means rotatably mounted on the hub of the second multi-bladed propeller, the second drive means adapted to rotate the blades of the second multi-bladed propeller, second pitch change gears rotatably mounted on the hub of the second multi-bladed propeller and arranged to drive the second drive means, the pitch change power unit drives the second pitch change gears via a sun gear, operation of the pitch change power unit causing relative rotation between the second drive means and the hub of the second multi-bladed propeller to change the pitch of the blades of the second multi-bladed propeller.

The invention will be more fully described by way of reference to the accompanying drawings, in which.

Figure 1:
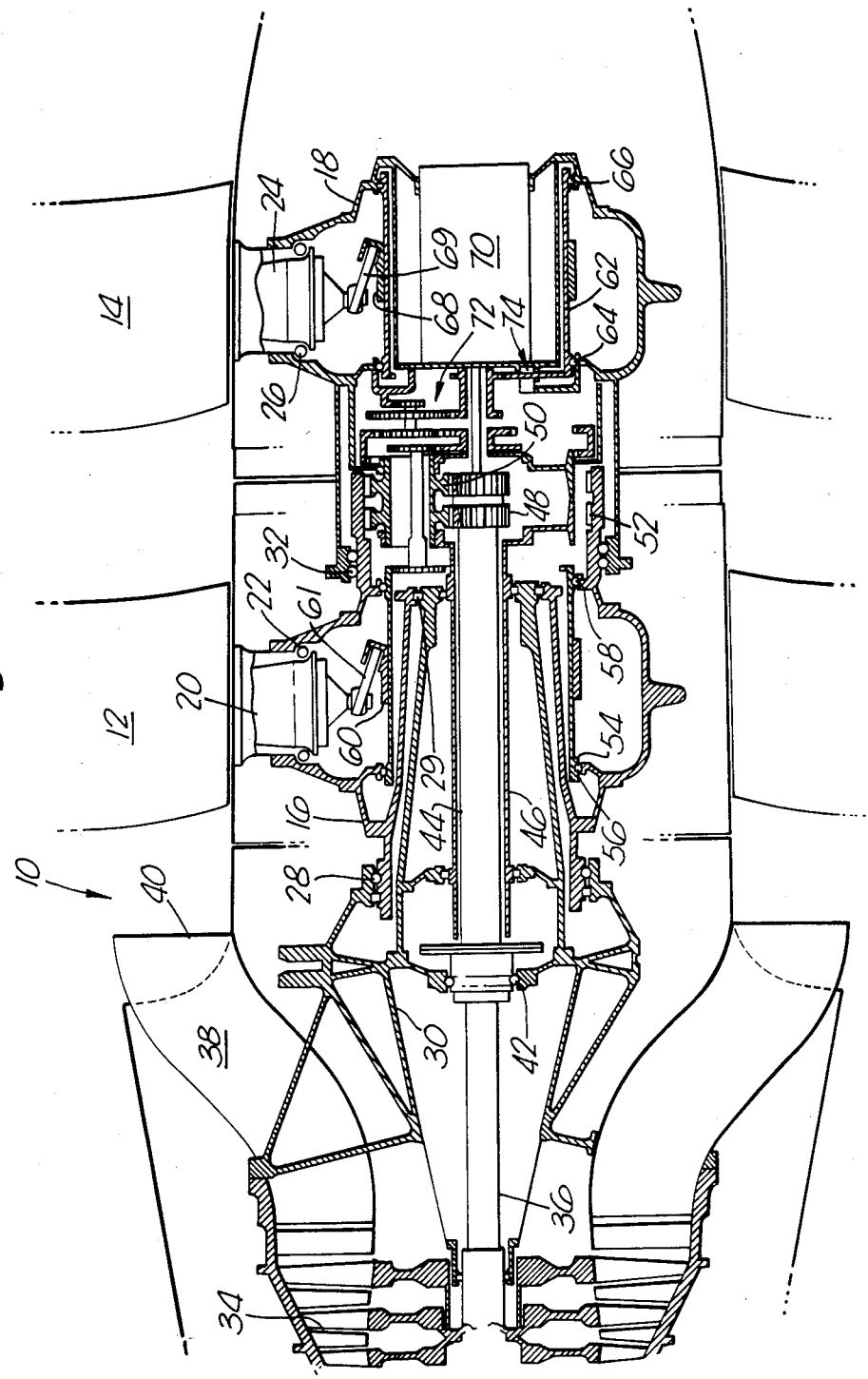
FIG. 1 is a sectional view longitudinally through a propeller module according to the present invention.

A propeller module 10 for an aero gas turbine engine is shown in FIG. 1, and in this example is a pusher type turbo-propeller aero gas turbine engine. The propeller module 10 comprises a first multi-bladed propeller 12 and a coaxial second multi-bladed propeller 14 arranged to be driven in contra-rotation. The first multi-bladed propeller 12 has a hub 16 which carries the blades, the blades being rotatably mounted in the hub 16 by means of pivotal root portions 20 of the blades and a corresponding ball bearing 22 for each blade root portion 20. Similarly the second multi-bladed propeller 14 has a hub 18 which carries the blades, the blades also being rotatably mounted in the hub 18 by means of pivotal root portions 24 and a corresponding ball bearing 26 for each blade root portion 24.

The first multi-bladed propeller 12 is rotatably mounted to a cantilevered structure 30, which extends in a downstream direction from the aero gas turbine engine, by means of bearings 28 on the upstream end of the hub 16 and bearing 29 on the downstream end of the hub 16. The cantilevered structure extends coaxially into the propeller hub 16, and a shaft 36 from a power turbine 34 extends coaxially through the cantilevered structure 30 and is secured coaxially to an extension shaft 44. The second multi-bladed propeller 14 is rotatably mounted onto the hub 16 of the first multi-bladed propeller 12 by means of bearings 32.

The extension shaft 44 drives a reduction gear train positioned coaxially with and axially between the first and second multi-bladed propellers. The extension shaft 44 has a sun gear 48 secured thereto, the sun gear 48 meshing with and driving a number of planet gears 50 rotatably mounted in a carrier 46. The planet gears 50 in turn meshing with and driving an annulus gear 52. The annulus gear 52 drives the hub 16 and first multi-bladed propeller 12, and the carrier 46 drives the hub 18 and the second multi-bladed propeller 14 in contra-rotation to the first multi-bladed propeller 12.

The first and second multi-bladed propellers 12, 14 respectively have pitch change mechanisms, the first and second multi-bladed propellers 12 and 14 have a first and a second drum 54 and 62 respectively which are positioned coaxially within and rotatably mounted onto the hubs 16 and 18 by bearings 56,58 and 64,66 respectively. The first and second drums 54 and 62 have recirculating ball threads, and nuts 60 and 68 are mounted on the threads of the drums.

The nuts 60 and 68 have a plurality of circumferentially arranged equi-spaced arms 61 and 69, one for each propeller blade, which are secured to the pivotal root portions 20 and 24 of the multi-bladed propellers. As the pivotal root portions 20 and 24 are rotatably mounted in the hubs 16 and 18 by ball bearings 22 and 26, movement of the nuts 60 and 68 along the drums 54 and 62, by rotation of the drums, will allow the propeller blades to be rotated to vary the pitch of the propeller blades.

The pitch of the propeller blades is varied by relative rotation between the hubs 16,18 and the drums 56,62, which causes the nuts 60 and 68 to rotate on the drums. The first and second drums 54,62 are caused to rotate relative to the hubs 16,18 by the pitch unit 70 and further pitch change mechanisms 72,74 incorporated in the reduction gear to drive the drums 54,62.

Figure 2:
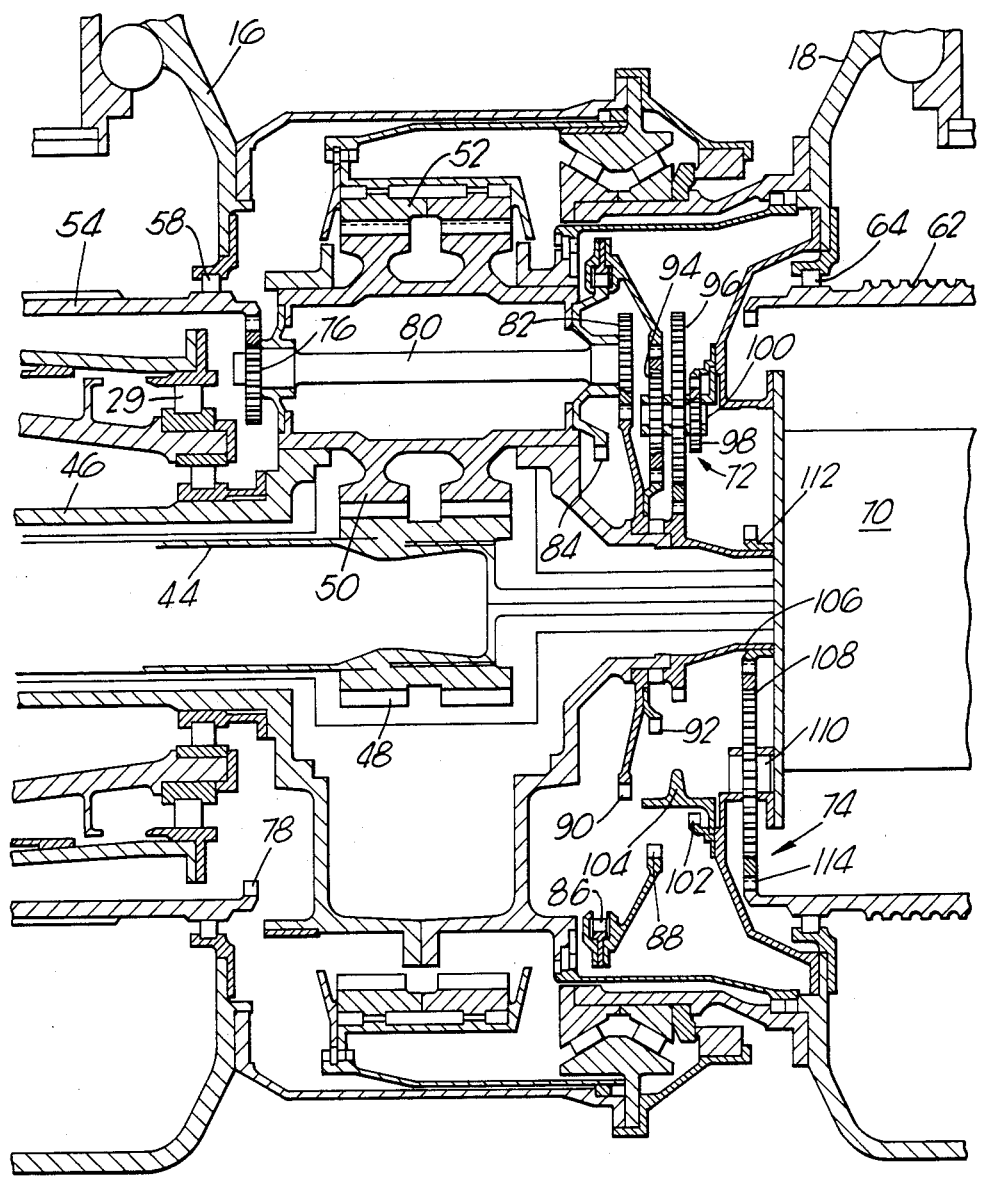
FIG. 2 is an enlarged sectional view of the reduction gear train and pitch change mechanism of the propeller module in FIG. 1.

FIG. 2 shows the pitch change mechanisms 72 and 74 in greater detail. The pitch change mechanism 72 for driving the drum 54 comprises a number of gears 76 meshing with a ring gear 78 on the drum 54, and each gear 76 is mounted on one end of a respective spindle 80, which is rotatably mounted on the carrier 46 and extends through a respective planet gear 50, and a gear 82 is mounted on the opposite end of each spindle 80. A compensating gear arrangement comprises a pair of ring gears 86,88 which are fixed to each other, a number of planet gears 94 and a pair of spur gears 90,92 which are rotatably mounted on the carrier 46 and are fixed to each other. A gear 84 is secured to each planet gear 50 and is arranged to drive the drum 54 via the compensating gear arrangement and the gears mounted on the spindles. The gears 84 mesh with the ring gear 86, ring gear 88 meshes with the planet gears 94, the planet gears 94 mesh with the spur gear 92 and the spur gear 90 meshes with the gears 82. The compensating gear arrangement is arranged to drive the drum 54 in the same direction and at the same speed as the hub 16 of the first multi-bladed propeller. The planet gears 94 thus rotate around the axes of rotation, while rotating around the axis of the first and second multi-bladed propellers in the same direction and at the same speed as the carrier 46 and hub 18. The planet gears 94 are rotatably mounted on spindles 100, together with fixed mounted planet gears 96 and 98, which extend from an annular member 104 abutting a portion of the hub 18. The planet gears 96 and 98 mesh with a sun gear 106, driven by the pitch change unit 70, and a ring gear 102, secured to the hub 18, respectively. The annular member 104 is positioned axially between the hub 18 and the gear 102 to limit axial movement of the annular member 104, and to act as a guide for relative rotation between the hub 18 and the annular member 104.

When the propeller module is operating with the pitch of the propeller blades set, the sun gear 106 is not driven by the pitch change unit 70 but rotates with the hub 18, which is driven by the carrier 46. There is no relative rotation between the gear 102 and sun gear 106, and therefore planet gears 96,98 do not rotate about their axis.

Figure 4:
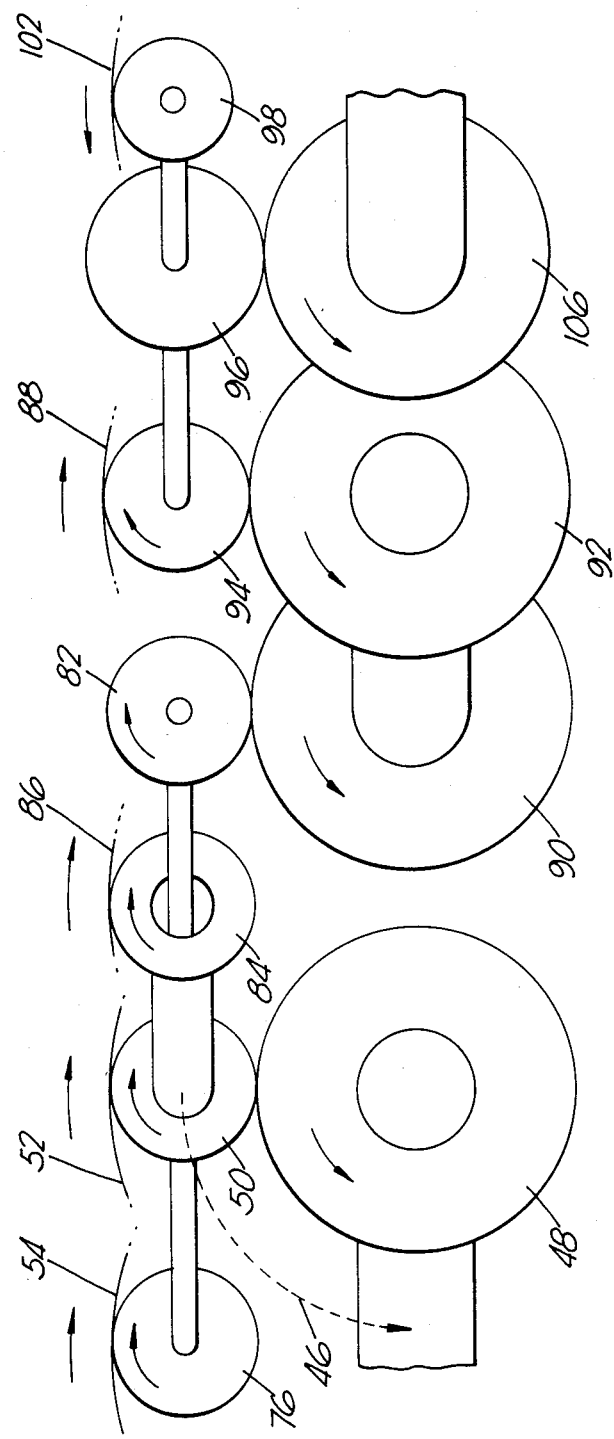
FIG. 4 is a diagrammatical view of the reduction gear train and pitch change mechanism of FIG. 2.

When the pitch of the propeller blades is to be varied the pitch change unit 70 drives the sun gear 106 and causes the sun gear to rotate relative to the carrier 46, hub 18 and gear 102. As a result the planet gears 98,96,94 move relative to the carrier 46 and cause relative rotation between the drum 54 and hub 16. The planet gears 96 and 98 form part of a reduction gear arrangement to obtain a suitable ratio between the sun gear 106 and the drum 54, of about 4 to 1 in the example shown. FIG. 4 shows the gear train arrangement diagrammatically, with directions of rotation of the gears.

The pitch change mechanism 74 for driving the drum 62 comprises a number of planet gears 108 meshing with a ring gear 114 on the drum 62, and each planet gear 108 is mounted on a spindle 110 which is rotatably mounted to the hub 18. The planet gears 108 also mesh with a sun gear 112 which is driven by the pitch change unit 70.

When the pitch of the propeller blades is set the drum 62 is driven by the planet gears 108, the sun gear 112 rotates at the same speed and in the same direction as the hub 18, and therefore the planet gears 108 do not rotate upon their axes of rotation, but drive the drum 62 at the same speed and in the same direction as the hub 18.

When the pitch of the propeller blades is to be varied the sun gear 112 rotates relative to the hub 18 and causes the planet gears 108 to rotate on their axes thus causing relative rotation between the hub 18 and drum 62.

Figure 3:
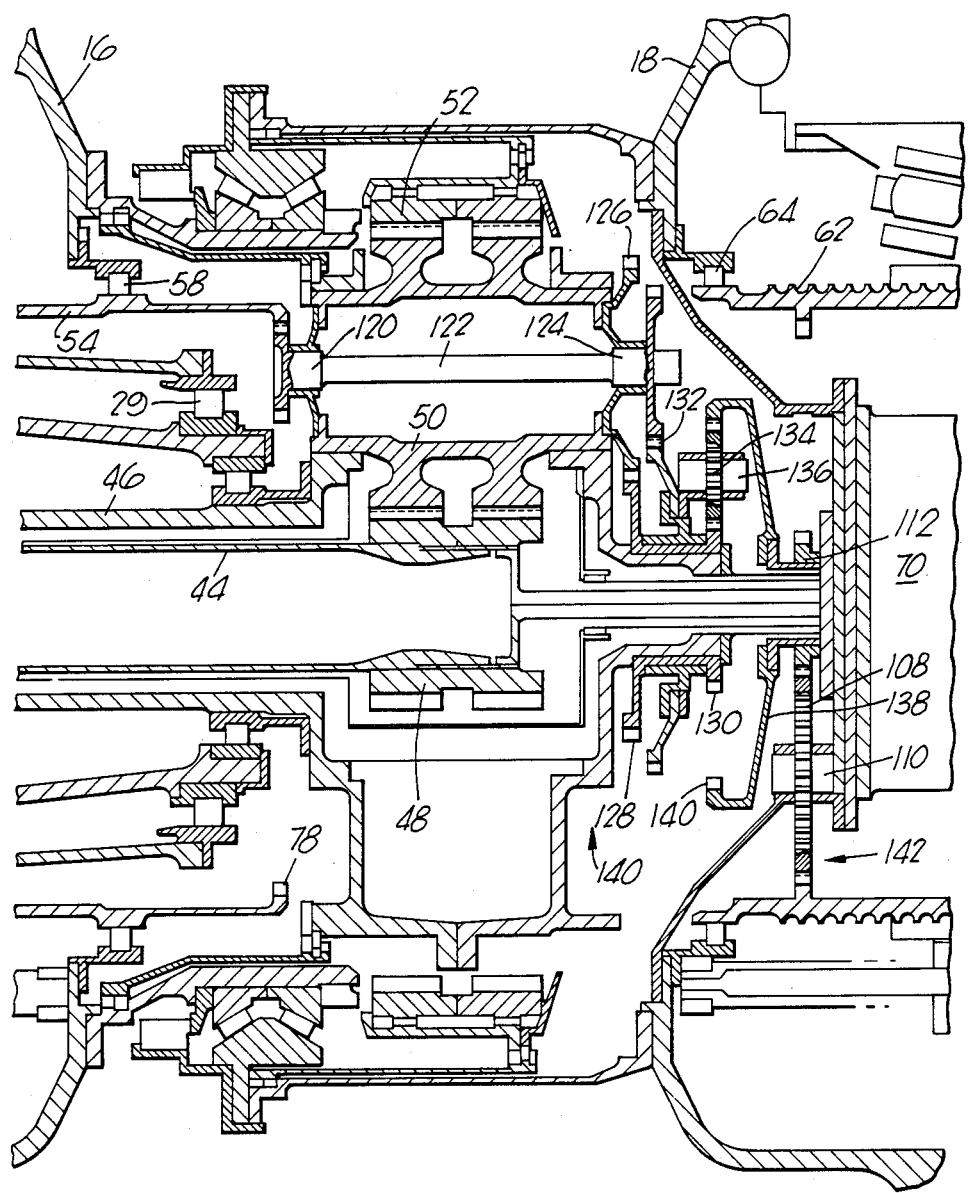
FIG. 3 is an enlarged sectional view of a second embodiment of the reduction gear train and pitch change mechanism of the propeller module in FIG. 1.

FIG. 3 shows pitch change mechanisms 140,142 for an alternative propeller module arrangement in which the carrier 46 drives the first multi-bladed propeller 12, and the annulus gear 52 drives the second multi-bladed propeller 14.

Figure 5:
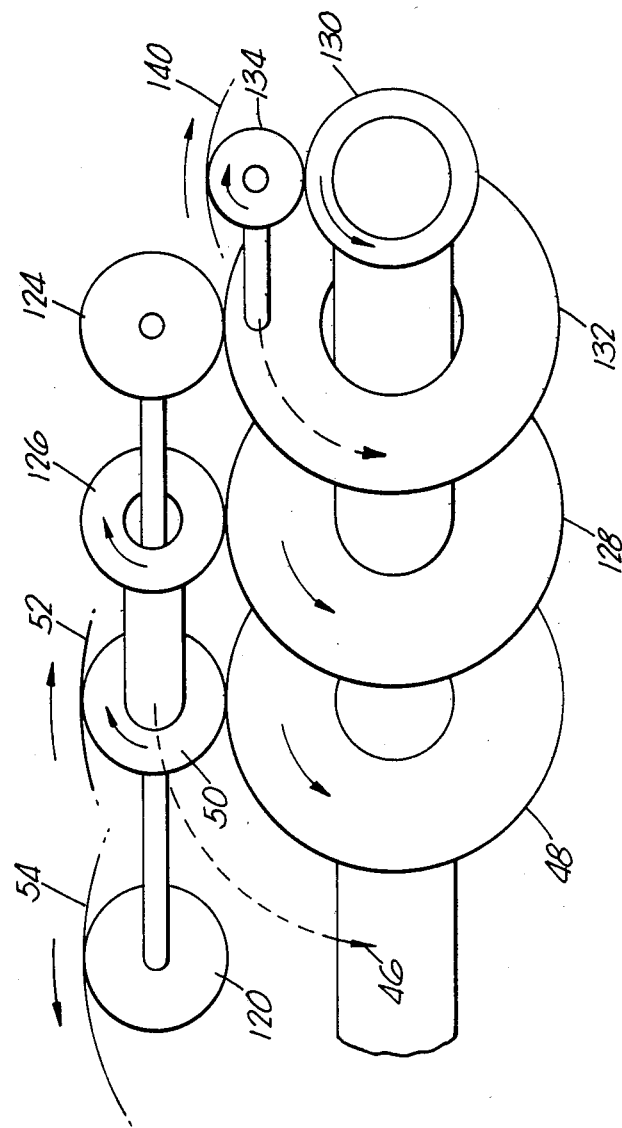
FIG. 5 is a diagrammatical view of the reduction gear train and pitch change mechanism of FIG. 3.

The pitch change mechanism 140 for driving the drum 54 comprises a number of gears 120 meshing with the ring gear 78 on the drum 54, and each gear 120 is mounted on one end of a respective spindle 122, which extends through and is rotatably mounted on the carrier 46 and extends through a respective planet gear 50, and a gear 124 is mounted on the opposite end of each spindle 122. A compensating gear arrangement comprises a pair of spur gears 128,130 which are rotatably mounted on the carrier 46 and are fixed to each other, a spur gear 132 rotatably mounted to the spur gears 128,130 and a number of planet gears 134 rotatably mounted on spindles 136 extending axially from spur gear 132. The spur gear 128 meshes with a gear 126 secured to each planet gear 50, spur gear 130 meshes with planet gears 134 and spur gear 132 meshes with the planet gears 124. A ring gear 140 driven by the pitch change unit 70 meshes with the planet gears 134. FIG. 5 shows the gear train arrangement diagrammatically, with directions of rotation of the gears.

When the propeller module is operating with the pitch of the propeller blades set, the ring gear 140 is not driven by the pitch change unit 70 but rotates with the hub 18, which is driven by the annulus gear 52. The compensation gear arrangement is so arranged that the planet gears 134 rotate about their axes while rotating around the axis of the first and second multi-bladed propellers in the same direction and at the same speed as the carrier 46 and hub 16. As a result of this the planet gears 124,120 are not driven to rotate about their axes but rotate with the carrier 46 and hence drive the drum 54 in the same direction and at the same speed as the hub 16, as seen in FIG. 5.

When the pitch of the propeller blades is to be varied, the pitch change unit 70 drives the ring gear 140 and causes the planet gears 134 while rotating about their axes, to rotate relative to the carrier 46 and hub 16. As a result of this the planet gears 124,130 rotate about their axes, while rotating with the carrier 46 and hence rotate the drum 54 relative to the hub 16 to vary the pitch of the blades.

The pitch change mechanism 142 for driving the drum 62 is identical to that shown in FIG. 2 and will not be discussed again.

The pitch change mechanisms described allow both the first and second multi-bladed propellers to have their blade pitches set independent of the differential speed between the two multi-bladed propellers. This arrangement also does not suffer from overloading of the pitch change mechanism due to the nuts on the drums reaching the end of travel on the recirculating ball screw threads. In this arrangement there is no tendency for the propeller blades to unfeather when windmilling on the ground.

The planet carrier torque is always greater than the annulus gear torque, and the torque ratio is constant and independent of propeller speed. The embodiments shown in FIGS. 2 and 3 are therefore suitable for use in tractor and pusher turbo propeller arrangements respectively. The design is arranged so that the propeller blades turn to finer pitch when the drum runs faster than the hub, and to coarser pitch when the drum runs slower than the hub.

Although drawn in the Figures as a pusher propeller, the invention could equally apply to a tractor propeller in which the propeller module is mounted on the upstream end of the gas turbine engine and is driven by the power turbine through a long drive shaft which extends coaxially through the engine.

Figure 6:
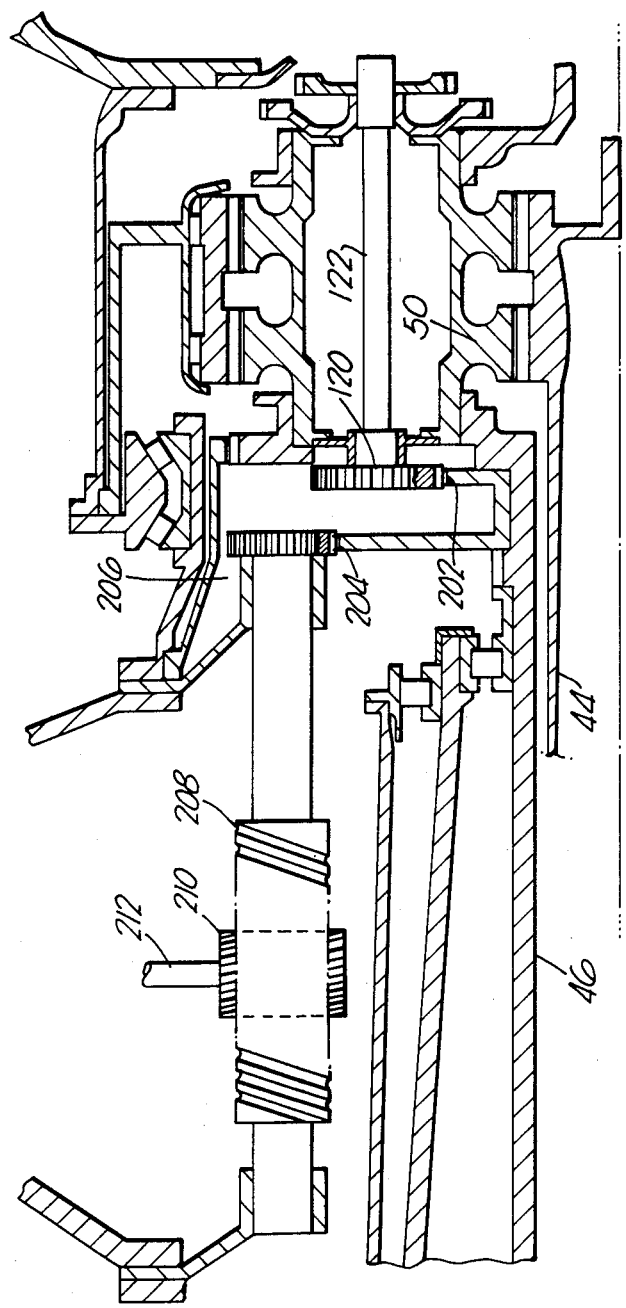
FIG. 6 is an enlarged sectional view of a third embodiment of a reduction gear train and pitch change mechanism for a propeller module.

An alternative pitch change mechanism is shown in FIG. 6 and is similar to FIG. 3 in which the carrier 46 drives the first multi-bladed propeller 12, and the annulus gear 52 drives the second multi-bladed propeller 14.

The pitch change mechanism is essentially the same as FIG. 3 except the gears 120, which are rotatably mounted on the carrier 46 by spindles 122 extending through the planet gears 50, drive a plurality of worm gears 208 via a pair of connected spur gears 202,204. The spur gears 202,204 are rotatably mounted on the carrier 46 and drive a plurality of gears 206, one being connected to each worm gear. Each worm gear 206 has a sector 210 and a lever 212 which are arranged to rotate the blades so as to change the pitch of the blades. Operation is essentially the same as in FIG. 3.

The worm and sector arrangement eliminates the need for a pitch lock mechanism as the blades are automatically locked by the irreversible action of the worm gear. The worm and sector could also be applied to the second multi-bladed propeller.

Figure 7:
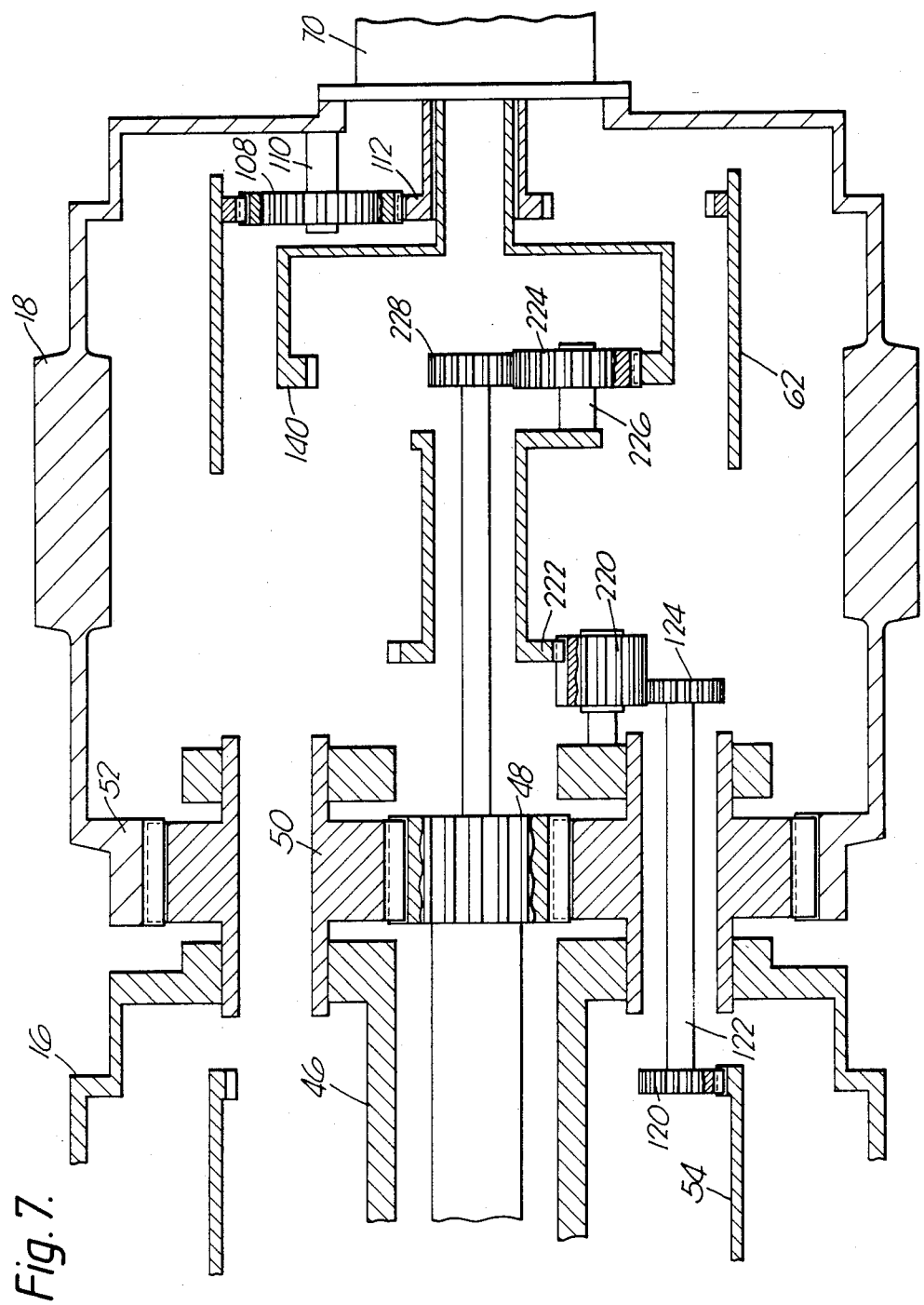
FIG. 7 is an enlarged sectional view of a fourth embodiment of the reduction gear train and pitch change mechanism of the propeller module in FIG. 1.

A further alternative pitch mechanism is shown in FIG. 7 and is used in arrangements in which the carrier 46 drives the first multi-bladed propeller 12, and the annulus gear 52 drives the second multi-bladed propeller 14.

The pitch change mechanism of the first multi-bladed propeller again comprises the first drum 54 which is driven by the gears 120 and 124 mounted on the spindle 122 which is rotatably mounted on the carrier 46 and extends through the planet gears 50. A compensating gear arrangement comprises a plurality of gears 220 rotatably mounted on the carrier 46 each gear 220 meshes with a respective gear 124 and with a spur gear 222. The spur gear 222 carries a plurality of gears 224 rotatably mounted on spindles 226. The gears 224 mesh with a ring gear 140 which is arranged to be driven by the pitch change power unit 20, and with a sun gear 228 which is connected to and driven by the sun gear 48.

When the propeller module is operating with the pitch of the propeller blades set, the ring gear 140 is not driven by the pitch change unit 70 but rotates with the hub 18 which is driven by annulus gear 52. The compensating gears are arranged so that the gear 224 rotate about their axes while rotating around the axis of the first and second multi-bladed propellers in the same direction and at the same speed as the carrier 46 and hub 16. The gears 220 also rotate with the carrier 46 and as a result of this the gears 220 do not drive the gears 124.

When the pitch of the propeller blades is to be changed, the pitch change unit 70 drives the ring gear 140 and causes the gears 224 while rotating about their axes to rotate relative to the carrier 46. As a result spur gear 222 is moved relative to the carrier 46 which causes gears 220 and hence gears 124 and the first drum to rotate, thus changing blade pitch.

We claim:

1. A propeller module for a gas turbine engine comprising a first multi-bladed propeller, a second multi-bladed propeller, a shaft and a reduction gear train, the first and second multi-bladed propellers being coaxial and driven in contra-rotation by the shaft via the reduction gear train, the reduction gear train being positioned axially between the first and second multi-bladed propellers, the reduction gear train comprising a sun gear, a plurality of planet gears and an annulus gear, the sun gear being driven by the shaft, the planet gears being driven by the sun gear and the annulus gear being driven by the planet gears, the planet gears being rotatably mounted in and driving the carrier member, the annulus gear and the carrier member being driven in contra-rotation by the planet gears, a first pitch change means to change the pitch of the blades of the first multi-bladed propeller, a second pitch change means to change the pitch of the blades of the second multi-bladed propeller and a pitch change power unit, the pitch change power unit being mounted on the second multi-bladed propeller to operate the first and second pitch change means, the first pitch change means comprising first drive means, first pitch change gears and compensating gears, the first drive means being rotatably mounted on the first multi-bladed propeller and being adapted to rotate the blades of the first multi-bladed propeller, the first pitch change gears comprising first gears, second gears and spindles, the spindles extending axially through the carrier member, the first gears and second gears being secured to opposite ends of the spindles, the spindles being rotatably mounted on the carrier member, the first gears of the pitch change gears being arranged to drive the first drive means, the compensating gears being rotatably mounted on the carrier member and being arranged to drive the second gears of the first pitch change gears so that a fixed blade pitch of the first drive rotates in the same direction and at the same speed as the first multi-bladed propeller, the pitch change power unit being adapted to drive the compensating gears so that relative rotation occurs between the first drive means and the first multi-bladed propeller to change the pitch of the blades of the first multi-bladed propeller, the compensating gears allowing the pitch of the blades of the first multi-bladed propeller to be set independently of the differential speed between the first and second multi-bladed propellers.

2. A propeller module for a gas turbine engine as claimed in claim 1 in which the annulus gear drives the first multi-bladed propeller and the carrier member drives the second multi-bladed propeller, the compensating gears comprising a first ring gear, a second ring gear, a plurality of planet gears, a first sun gear, a second sun gear and a plurality of gears secured to and driven by the planet gears of the reduction gear train, the first and second ring gears are secured to each other, the first and second sun gears are secured to each other, the first and second sun gears being rotatably mounted on the carrier member, the gears secured to the planet gears of the reduction gear train being arranged to drive the first ring gear, the planet gears meshing with the second ring gear and the second sun gear, the first sun gear meshing with the second gears of the first pitch change gears, the compensating gears being arranged so that the planet gears rotate about their axes of rotation but are non-rotatable relative to the carrier member when the pitch of the blades is fixed, the pitch change power unit being adapted to rotate the planet gears of the compensating gears relative to the carrier member to cause relative rotation between the first drive means and the first multi-bladed propeller.

3. A propeller module for a gas turbine engine as claimed in claim 1 in which the annulus gear drives the second multi-bladed propeller and the carrier member drives the first multi-bladed propeller, the compensating gears comprising a first sun gear, a second sun gear, a third sun gear, a plurality of planet gears and a plurality of gears secured to and driven by the planet gears of the reduction gear train, the first and second sun gears are secured to each other, the first and second sun gears are rotatably mounted on the carrier member, the third sun gear being rotatably mounted on the first and second sun gears, the planet gears being rotatably mounted on the third sun gear, the gears secured to the planet gears of the reduction gear train being arranged to drive the first sun gear, the planet gears meshing with the second sun gear, the third sun gear meshing with the second gears of the first pitch change gears, the compensating gears being arranged so that the planet gears rotate about their axes of rotation but are non-rotatable relative to the carrier member when the pitch of the blades is fixed, the pitch change power unit being adapted to rotate the planet gears of the compensating gears relative to the carrier member to cause relative rotation between the drive means and the first multi-bladed propeller.

4. A propeller module for a gas turbine engine as claimed in claim 1 in which the annulus gear drives the second multi-bladed propeller and the carrier member drives the first multi-bladed propeller, the compensating gears comprising a first sun gear, a plurality of planet gears, a second sun gear and a plurality of gears rotatably mounted on the carrier member, the plurality of planet gears being rotatably mounted on the first sun gear, the second sun gear being secured to and driven by the sun gear of the reduction gear train, the gears rotatably mounted on a carrier member being arranged to mesh with and to drive the second gears of the first pitch change gears, the gears rotatably mounted on the carrier member being arranged to mesh with the first sun gear, the plurality of planet gears being arranged to mesh with the second sun gear, the compensating gears being arranged so that gears rotatably mounted on the carrier member are non-rotatable relative to the carrier member and the pitch of the blades is fixed, the pitch change power unit being adapted to rotate the planet gears relative to the carrier member to cause relative rotation between the first drive means and the first multi-blade propeller.

5. A propeller module for a gas turbine engine as claimed in claim 2 in which the pitch change power unit drives a sun gear, a plurality of first planet gears, a plurality of second planet gears, a plurality of spindles and a ring gear, the first and second planet gears being coaxial with and secured to the spindles, the ring gear being secured to the second multi-bladed propeller, the second planet gears meshing with the ring gear, the planet gears of the compensating gears being coaxial with and rotatably mounted on the spindles, the sun gear driven by the pitch change power unit meshing with the first planet gears, the pitch change power unit causing relative rotation between the sun gear and the ring gear fixed to the second multi-bladed propeller to cause rotation of the first and second planet gears and the planet gears of the compensating gears relative to the carrier member.

6. A propeller module for a gas turbine engine as claimed in claim 3 or claim 4 in which the pitch change power unit drives the planet gears of the compensating gears via a ring gear, operation of the pitch change power unit causing relative rotation between the ring gear and second multi-bladed propeller causing the planet gears to rotate relative to the carrier member.

7. A propeller module for a gas turbine engine as claimed in claim 1 in which the first drive means comprises a first drum positioned coaxially within and rotatably mounted on the hub of the first multi-bladed propeller, the first drum having a first recirculating ball screw and nut adapted to rotate the blades of the first multi-bladed propeller.

8. A propeller module for a gas turbine engine as claimed in claim 1 in which the first drive means comprises a plurality of worm gears rotatably mounted on the hub of the first multi-bladed propeller, each worm gear having a sector and lever adapted to rotate a corresponding blade of the first multi-bladed propeller.

9. A propeller module for a gas turbine engine as claimed in claim 1 in which the second pitch change means comprises a second drive means rotatably mounted on the hub of the second multi-bladed propeller and adapted to rotate the blades of the second multi-bladed propeller, second pitch change gears rotatably mounted on the hub of the second multi-bladed propeller, and arranged to drive the second drive means, the pitch change power unit drives the second pitch change gears via a sun gear, operation of the pitch change power unit causing relative rotation between the second drive means and the hub of the second multi-bladed propeller to change the pitch of the blades of the second multi-bladed propeller.

10. A propeller module for a gas turbine engine as claimed in claim 9 in which the second drive means comprises a second drum positioned coaxially within and rotatably mounted on the hub of the second multi-bladed propeller, the second drum having a second recirculating ball screw and nut adapted to rotate the blades of the second multi-bladed propeller.

11. A propeller module for a gas turbine engine as claimed in claim 9 in which the second drive means comprises a plurality of worm gears rotatably mounted on the hub of the second multi-bladed propeller, each worm gear having a second and lever adapted to rotate a corresponding blade of the second multi-bladed propeller.

* * * * *